(12) United States Patent
Sarigul-Klijn et al.

(10) Patent No.: US 7,861,972 B1
(45) Date of Patent: Jan. 4, 2011

(54) RELEASE MECHANISM FOR A FORWARD AND AFT RESTRAINED LOAD IN AN AIRCRAFT

(75) Inventors: Martinus M. Sarigul-Klijn, Dixon, CA (US); Nesrin Sarigul-Klijn, Dixon, CA (US)

(73) Assignee: Airlaunch LLC, Kirkland, WA (US)

( * ) Notice: Subject to any disclaimer, the term of this patent is extended or adjusted under 35 U.S.C. 154(b) by 487 days.

(21) Appl. No.: 11/970,768

(22) Filed: Jan. 8, 2008

Related U.S. Application Data

(62) Division of application No. 11/280,494, filed on Nov. 16, 2005, now Pat. No. 7,338,015.

(51) Int. Cl.
*B64D 1/12* (2006.01)
*B64D 1/10* (2006.01)

(52) U.S. Cl. .................. 244/137.3; 244/118.1

(58) Field of Classification Search .............. 244/137.1, 244/137.3, 137.4, 136, 149, 151 R, 147, 138 R, 244/118.1; 410/102, 106, 80, 92; 294/82.26
See application file for complete search history.

(56) References Cited

U.S. PATENT DOCUMENTS 3,306,234 A * 2/1967 Hansen et al. ................. 410/55
4,144,821 A * 3/1979 Lang ........................... 410/79

* cited by examiner

*Primary Examiner*—Joshua J Michener
(74) *Attorney, Agent, or Firm*—Stiennon & Stiennon

(57) ABSTRACT

An object is deployed from an aircraft using gravity extraction of the object with the aid of a small parachute. The object is restrained in the fore and aft directions on either side of the center of gravity by fore and aft loading chains which hold the object to a loading deck. The chains are attached to the object by pear shaped rings mounted to a load plate. The load plate is supported on a lower attachment plate mounted to the object and is attached by a pin to an upper attachment plate also mounted to the object. Pulling the pin causes the load plate to rotate about a hinge formed on the lower attachment plate followed by release of the load plate from the lower attachment plate and the object to be deployed.

5 Claims, 4 Drawing Sheets

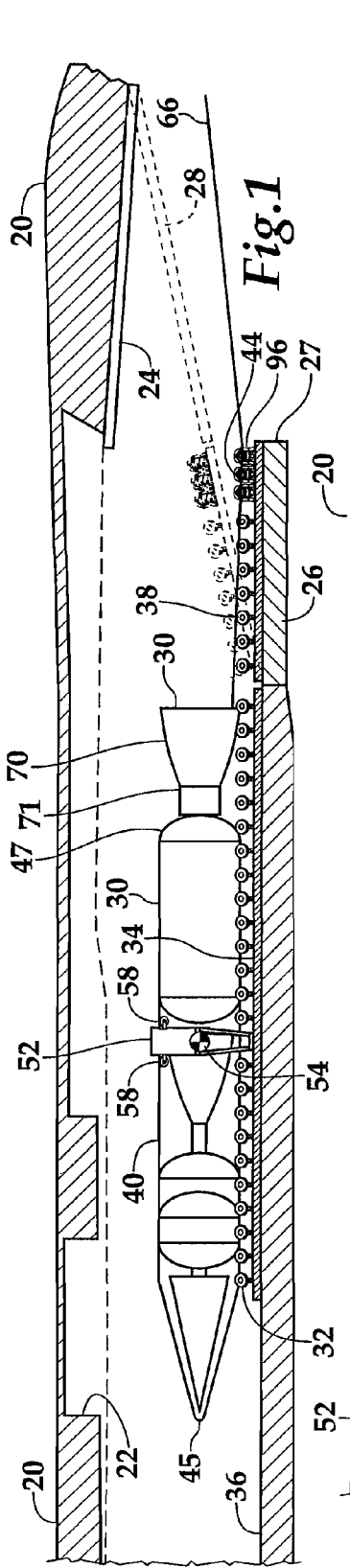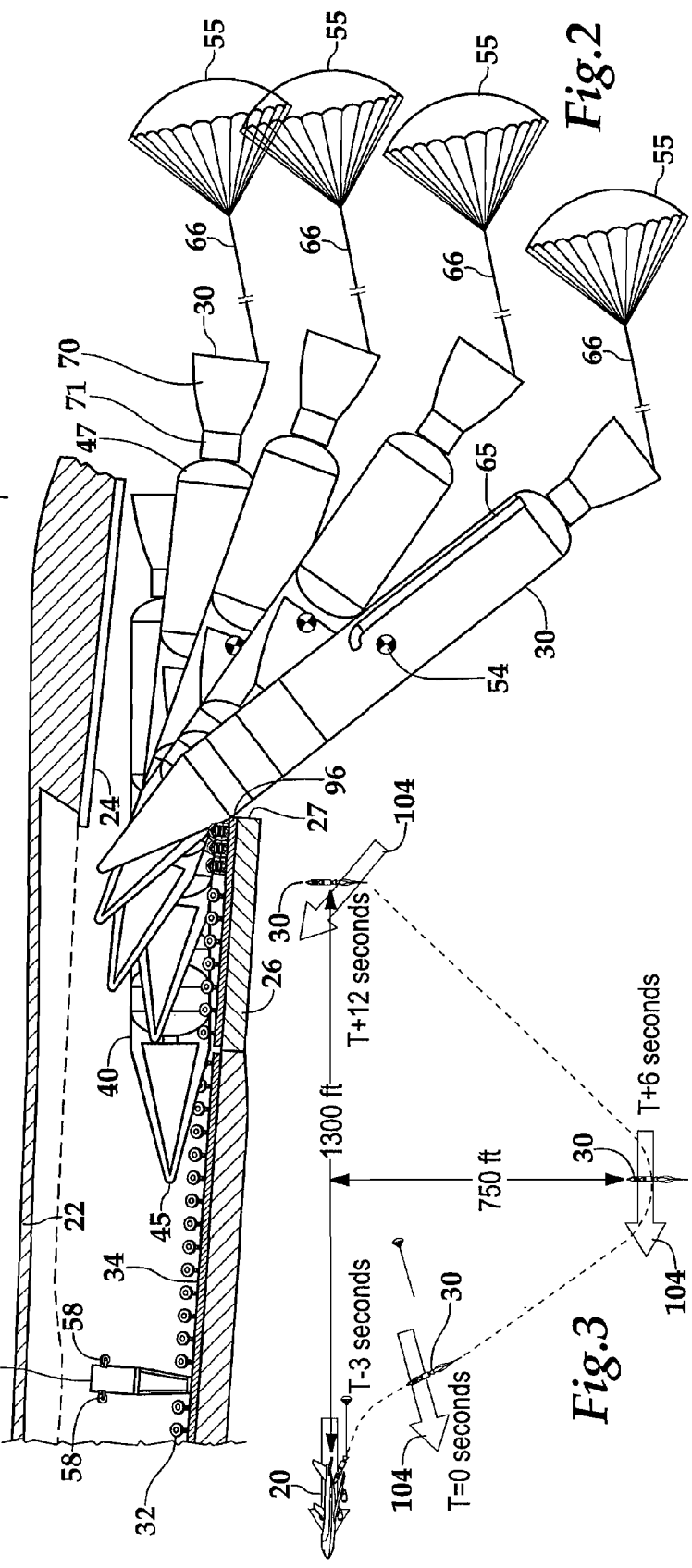

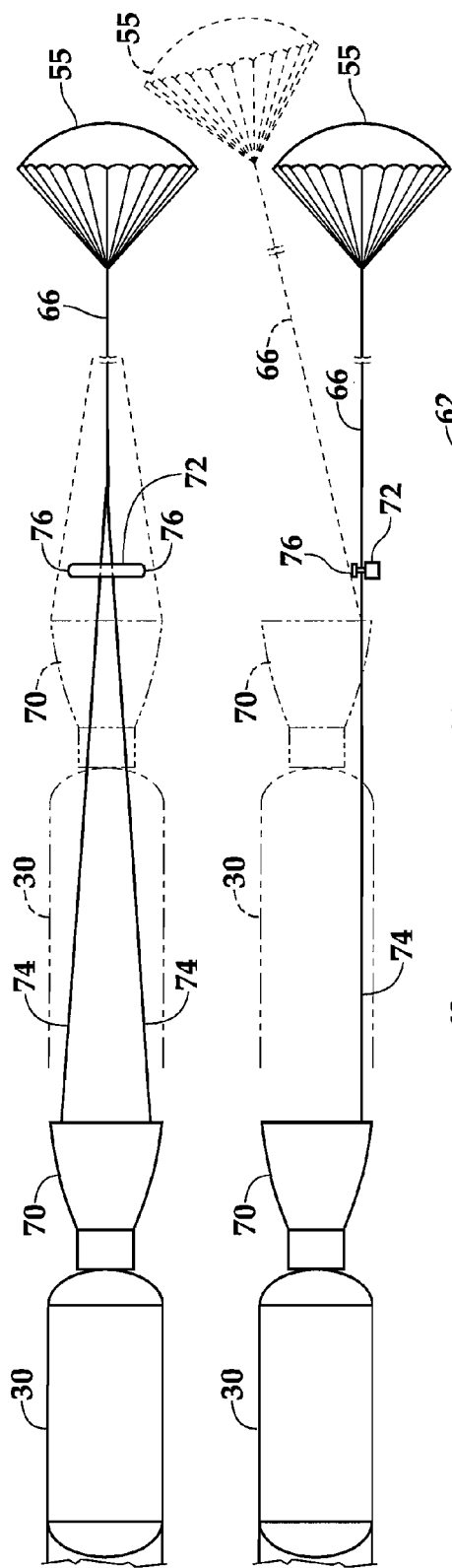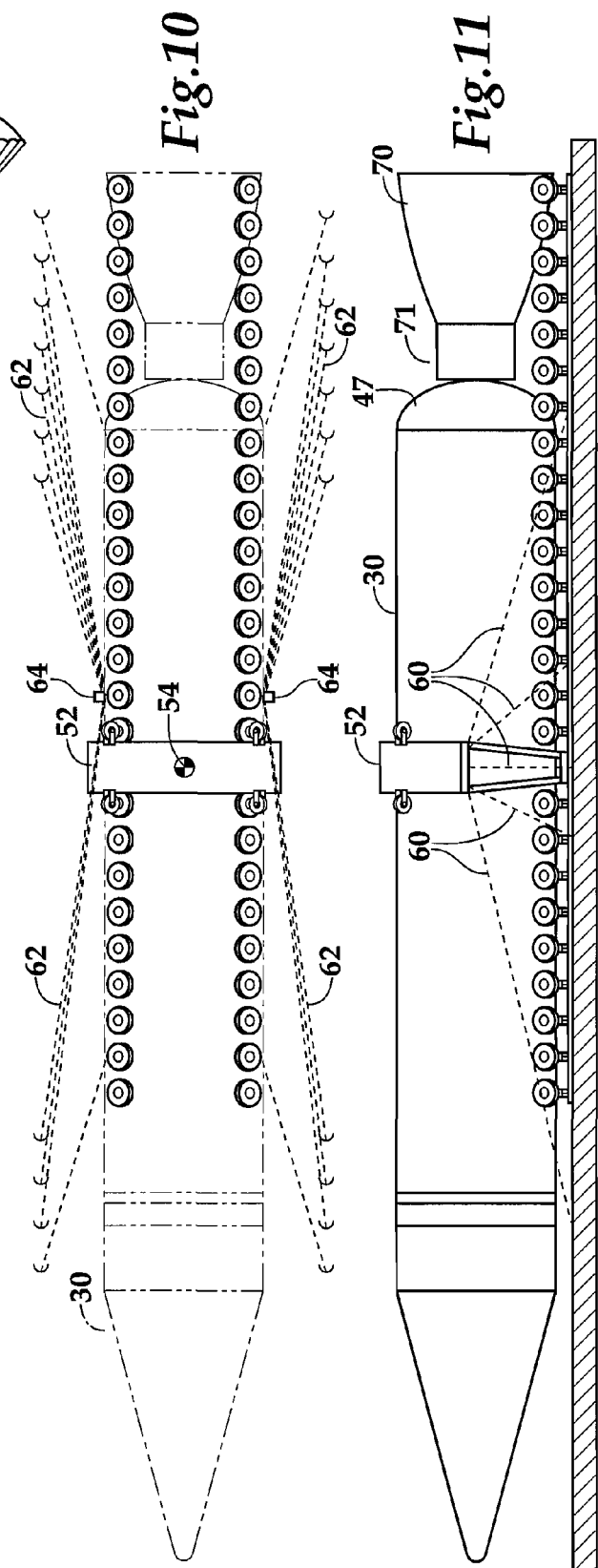

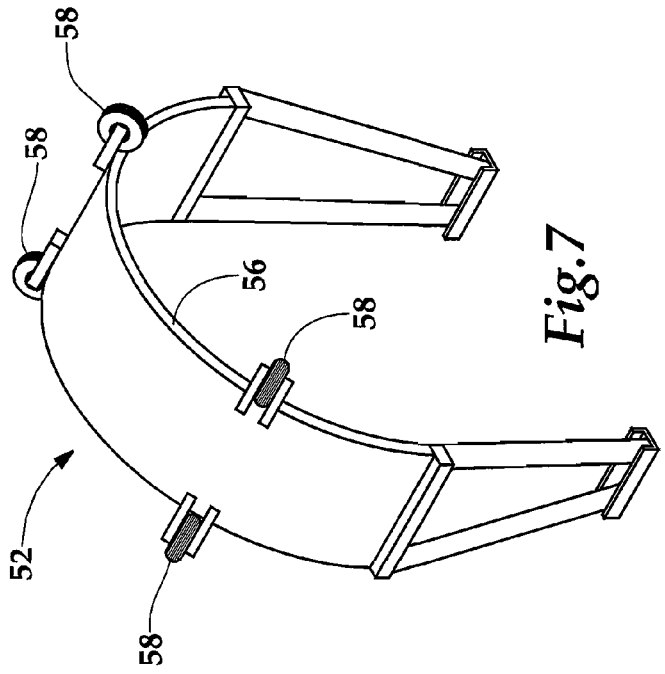
*Fig.6*
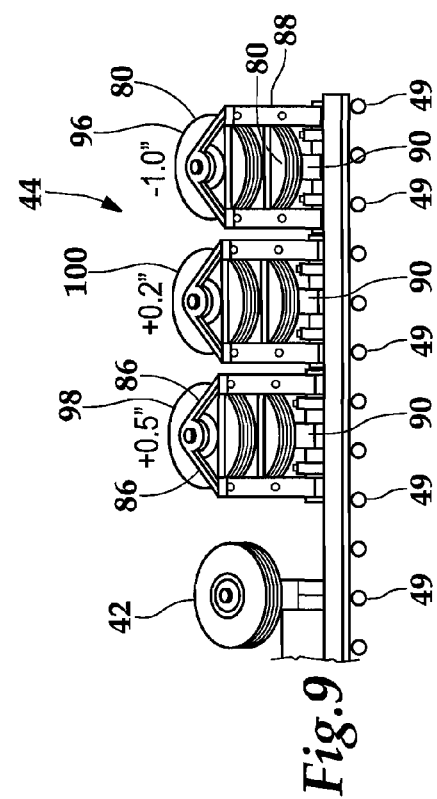
*Fig.7*
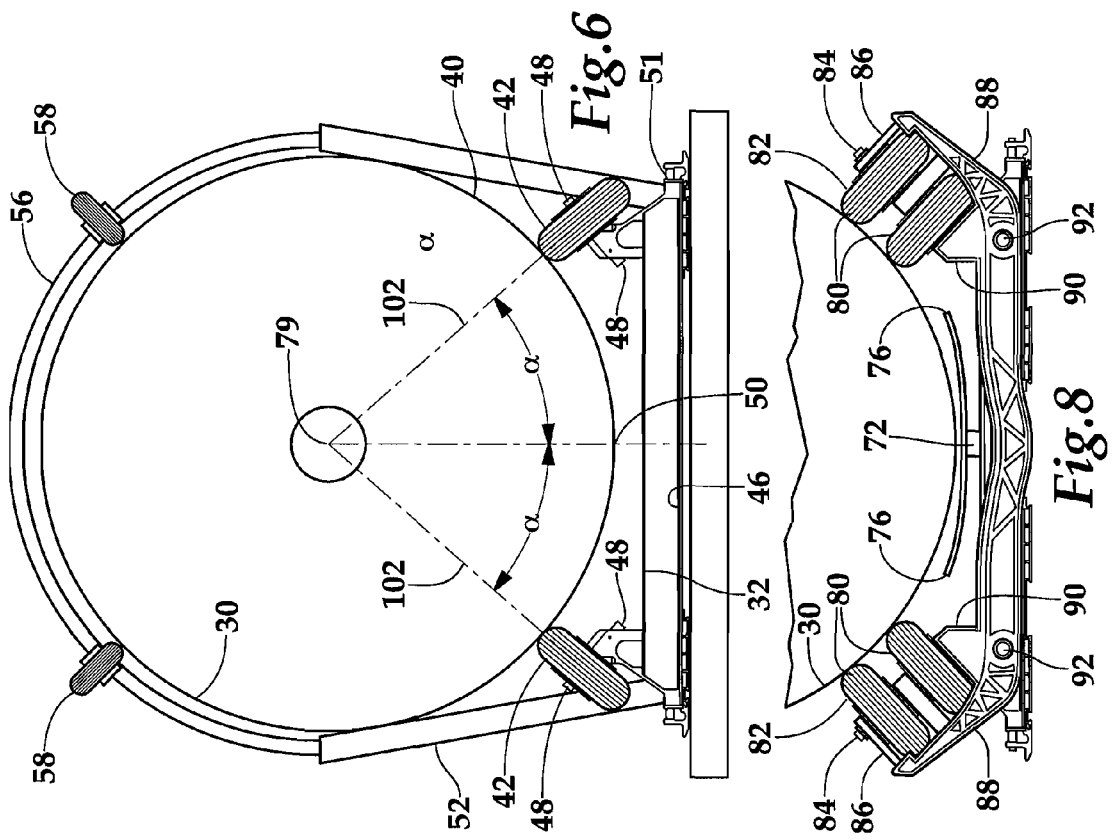
*Fig.8*
*Fig.9*

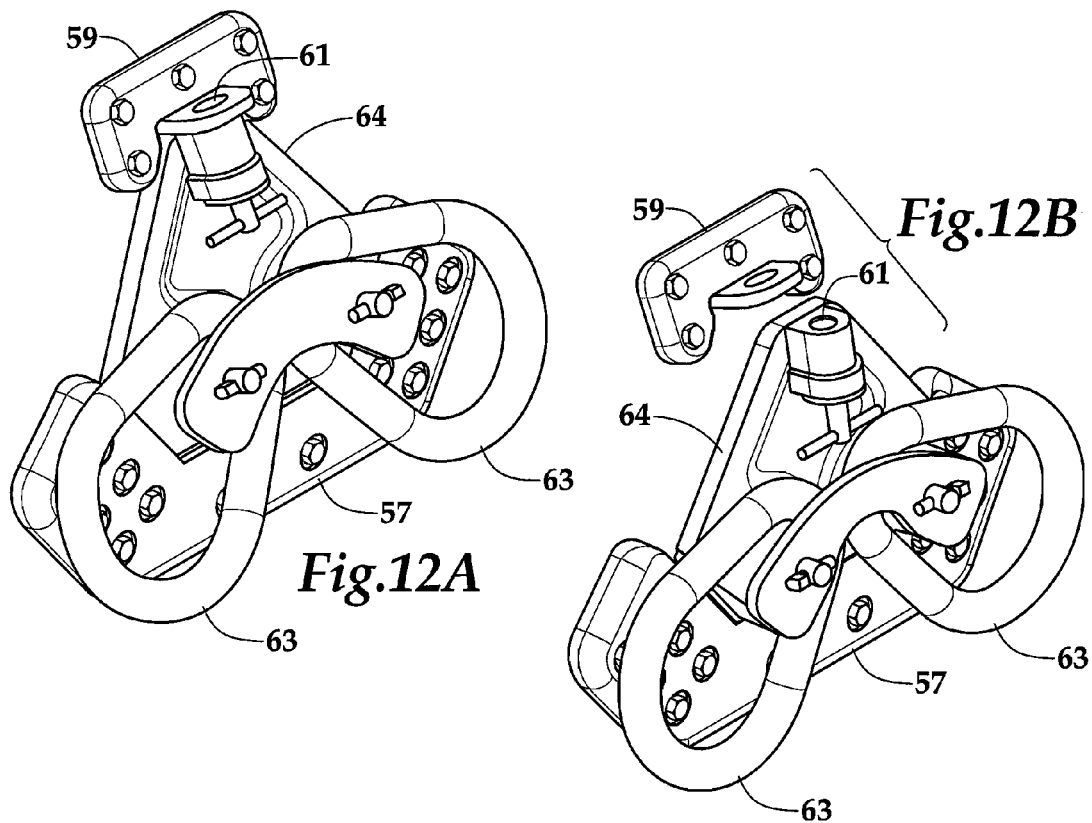
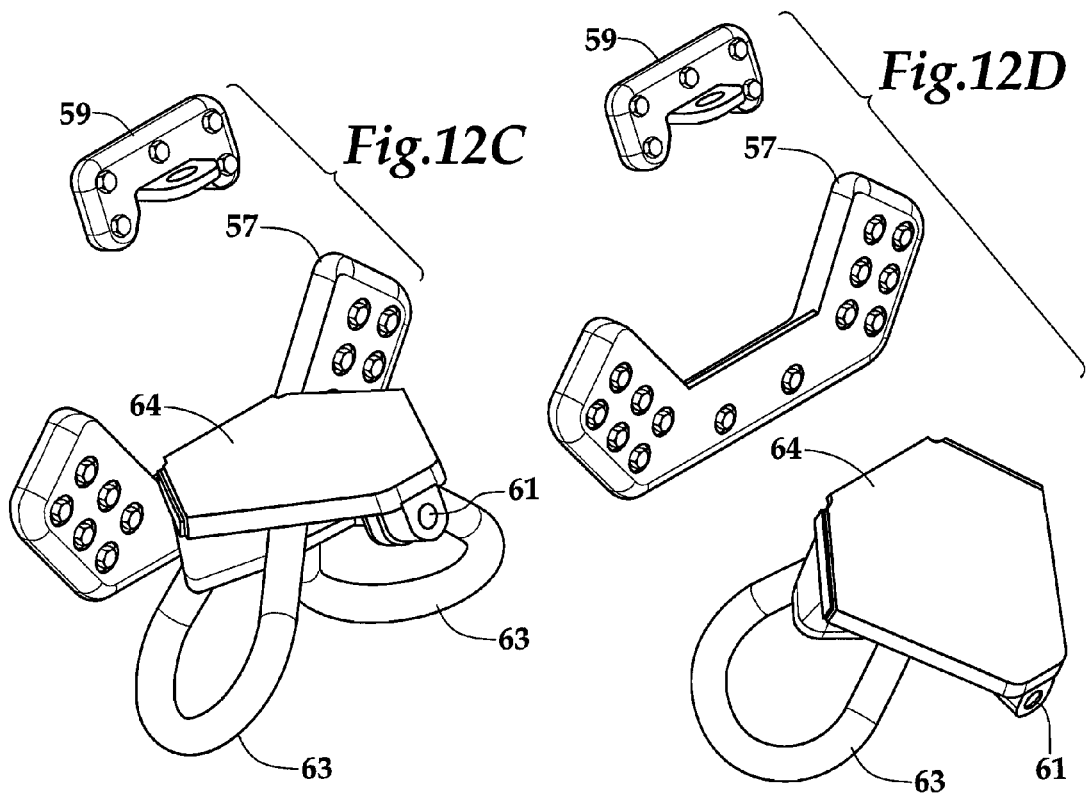

RELEASE MECHANISM FOR A FORWARD AND AFT RESTRAINED LOAD IN AN AIRCRAFT

CROSS REFERENCES TO RELATED APPLICATIONS

This application is a divisional application of U.S. application Ser. No. 11/280,494, filed Nov. 16, 2005, the disclosure of which is incorporated herein by reference.

STATEMENT AS TO RIGHTS TO INVENTIONS MADE UNDER FEDERALLY SPONSORED RESEARCH AND DEVELOPMENT

This invention was made with Government support under Agreement No. HR0011-04-9-4072 awarded by DARPA. The Government has certain rights in the invention.

BACKGROUND OF THE INVENTION

Many designs have been considered for launching an orbital launch vehicle from a carrier aircraft. The designs which have been considered include carrying the launch vehicle on top of the carrier aircraft, on the bottom of the aircraft, under the aircraft wing, towing the launch vehicle behind the aircraft, and carrying the launch vehicle within the cargo area inside the aircraft. Launching a launch vehicle from a carrier aircraft, while having some limitations in terms of maximum gross weight of the launch vehicle, has many operational advantages. Launching from a carrier aircraft avoids the costs and limitations associated with ground-based launch ranges. Ranges may have restrictions limiting the number of launches which can be performed in a given time frame. At a typical rocket range, launches will be limited with respect to the launch azimuth which can be flown by the necessity of avoiding overflight of densely populated areas. A launch vehicle which is launched from a carrier aircraft, on the other hand, can be based anywhere where the carrier aircraft can be based. A carrier aircraft also has the advantage that it can be used to avoid unfavorable weather by flying around or over a weather system. For low-cost launch systems, the cost of using a national range in the United States can exceed 30 percent of total costs associated with a particular launch. The limitations associated with fixed ranges have caused at least one supplier of launch services to fly vehicle launches from a floating ocean platform, and another supplier of launch services to use a carrier aircraft where the launch vehicle is attached beneath the carrier aircraft or beneath the carrier wing.

Air launch can also provide a performance benefit based on the velocity of the carrier aircraft which is imparted to the launch vehicle at the time of separation from the carrier aircraft. Performance benefit is also gained by reduction in aerodynamic drag. Such drag can be substantially decreased by operating the launch vehicle at an initial starting altitude which is above one half to three quarters of the atmosphere. Reduced atmospheric pressure can increase performance of the first stage engine by allowing a greater area ratio between the rocket engine throat and the expansion bell. Reduced atmospheric pressure also allows the use of a lower engine chamber pressure, which, particularly in the case of a pressure fed vehicle, can result in substantially decreased structural weight for the propellant tanks.

In the past large airborne payloads, including in one case, a test missile, have generally been extracted from the air cargo bay along with a cradle on which the payload rests, by parachutes released into the air stream behind the carrier aircraft. This known approach has several disadvantages including high loadings caused by the substantial extraction loads, and the need to expend or recover the extraction cradle. Furthermore, the extraction parachutes, followed by orientation parachutes, substantially eliminate the forward velocity of the launch vehicle, thus limiting the benefit which is gained from the air launch. What is needed is an apparatus and method for dropping a launch vehicle from a carrier craft which minimizes loads on the launch vehicle and which minimizes loss of forward velocity, and which eliminates the need for a drop cradle.

SUMMARY OF THE INVENTION

The launch vehicle air launch method and apparatus of this invention employs gravity extraction of the launch vehicle assisted by a small drag parachute which assists the extraction and damps yaw and pitch of the launch vehicle. A carrier aircraft is pitched up 3-15 preferably 5-7 degrees so the load deck of the carrier has an upward slope. The launch vehicle is supported on two rows of tires which are rotatably mounted to the aircraft. The tires are arranged in groups of two opposed tires which ride against the outer circumference of the launch vehicle. The opposed tires are positioned about 41 degrees along the circumference on either side of the low point of the vehicle circumference. When the carrier aircraft pitches upward the launch vehicle is released for movement with respect to the aircraft along a track created by the supporting rows of tires and the launch vehicle begins to exit the aircraft under the influence of gravity assisted by the small drag parachute. Gravity and the drag force of the parachute causes the launch vehicle to roll on the tires along the load deck and out of the carrier aircraft. Because the extraction forces are dominated by gravity, the launch vehicle acquires a rotation in the pitch plane as the launch vehicle leaves the aircraft. The rotation in the pitch plane is produced when the center of gravity of the launch vehicle passes over the last tires of the rows of tires and gravity causes the vehicle to tip, i.e. to rotate in the pitch plane.

After the launch vehicle clears the carrier aircraft it continues to rotate in the pitch plane, but is simultaneously damped in the pitch plane by the extraction parachute which is attached to the first stage engine bell. Within a few seconds of leaving the carrier aircraft the nose of the launch vehicle has pitched upwardly to an attitude which is greater than about 60° from the horizontal plane due to the rotation of the launch vehicle in the pitch plane. The first stage is then ignited and burns through the riser lines to the parachute, thus releasing the drag parachute. The carrier aircraft continues in level flight, and turns away from the flight path to increase separation between carrier aircraft and the launch vehicle. The launch vehicle, following first stage engine ignition, overcomes downward velocity caused by gravity and is controlled to a vertical flight path and begins its ascent to orbit, crossing the altitude of the carrier aircraft behind and substantially spaced from the carrier aircraft.

To minimize the load on any single tire pair, a greater number of tires are arranged at the end of the track formed by the pairs of tires where the vehicle tips as it exits the carrier aircraft. The last three tire groups utilize four tires arranged circumferentially with pairs of tires on each sides of the launch vehicle. The four tires making up the first group of the last three tire groups tires are arranged slightly above of the level of the groups of all the previously transited groups of two opposed tires which ride against the outer circumference of the launch vehicle. The four tires making up the second to last tire group are arranged above the level of the previously transited groups of two opposed tires and lower than the tires in the first group of the last three tires groups. The four tires making up the last group of tires are arranged below the level of the previously transited groups of two opposed tires. By adjusting the relative height of the last three groups it is possible to reduce the maximum load on any one group of tires.

It is an object of the present invention to provide a method of air launching a launch vehicle which maximizes the payload performance of the dropped vehicle.

It is a further object of the present invention to provide a method of launching a launch vehicle which minimizes the amount of equipment which falls away from the launch vehicle.

It is a yet further object of the present invention to provide an apparatus from which a launch vehicle can be gravity extracted from the cargo compartment of a carrier aircraft.

It is another object of the present invention to provide an apparatus for limiting the line load applied to the loading ramp of a carrier aircraft as a launch vehicle exits the aircraft.

It is yet another object of the present invention to provide an apparatus and method for bringing the launch vehicle to a near vertical orientation while minimizing hardware and loss of forward velocity.

Further objects, features and advantages of the invention will be apparent from the following detailed description when taken in conjunction with the accompanying drawings.

BRIEF DESCRIPTION OF THE DRAWINGS

FIG. 1 is a schematic side elevational fragmentary view of the launch vehicle, the carrier aircraft, and the storage and launch carrier of this invention.

FIG. 2 is a schematic side elevational fragmentary view of the launch vehicle being gravity extracted from the carrier aircraft along the launch carrier of this invention.

FIG. 3 is a schematic side elevational view of the orientation and relative position of the launch vehicle of FIG. 1 vis-à-vis the carrier aircraft.

FIG. 4 is a schematic top view of the shroud lines of the apparatus of FIG. 1.

FIG. 5 is a schematic side elevational view of the shroud lines of the apparatus of FIG. 1.

FIG. 6 is a front elevational view of the launch vehicle, launch carrier and vertical restraint system of FIG. 1.

FIG. 7 is an isometric view of the vertical restraint system of FIG. 6.

FIG. 8 is a back elevational view of the rearmost tires on the launch carrier of FIG. 1.

FIG. 9 is fragmentary side elevational view of the loading ramp mounted portion of the launcher showing the tipping rolls of FIG. 1.

FIG. 10 is a schematic fragmentary top view of a tie down arrangement for stabilizing the launch vehicle of FIG. 1.

FIG. 11 is a side elevational view of the tie down system for the vertical restraint system of FIG. 6.

FIGS. 12A-12D are isometric views of a release mechanism shown for releasing the tie down chains of FIG. 10.

DESCRIPTION OF THE PREFERRED EMBODIMENTS

Referring more particularly to FIGS. 1-12D, wherein like numbers refer to similar parts, a carrier aircraft 20, for example a C-17, is shown in FIGS. 1 and 2. The carrier aircraft 20 has an internal cargo bay 22, which opens to the rear 24 of the aircraft so that cargo can be air dropped. The cargo bay 22 has a loading ramp 26 with an end 27 over which air cargo is dropped. The loading ramp 26 can function as one half of the rearwardly facing cargo door 28 as shown in FIG. 1. A launch vehicle 30 rests on a carrier and drop system 32 which has two parts, a carrier part 34, which mounts to the cargo deck 36 within the cargo bay 22, and a vehicle drop portion 38 which includes three final banks of rolls 44 which make up a teeter section. The drop portion 38 is mounted to the loading ramp 26.

As shown in FIG. 6, the carrier and drop system 32 supports the external cylindrical shell 40 of the launch vehicle 30 on pairs of pneumatic tires 42. As shown in FIG. 1, the launch vehicle 30 is arranged within the aircraft cargo bay 22 with the payload end 45 of the launch vehicle pointed towards the front of the aircraft, so that the end 47 of the launch vehicle having the rocket engine 71 faces the rear of the aircraft and the cargo door 28. The tires 42 are general aviation, pneumatic tires such as front landing gear tires which are designed to withstand the low pressure of the drop altitude and withstand a significant amount of heating. The tires in the illustrated design have an air pressure in a range between about 100 and about 135 psi, and have a diameter of about 17.5 inches where the cylindrical shell has a diameter of 87 inches. The pneumatic tires 42 support the cylindrical launch vehicle 30 in a way that limits point loads and provides vibration damping. The load supported by any tire is limited by the tire pressure and the area of the tire in contact with the launch vehicle's cylindrical shell 40. Loading any one tire causes the tire to compress, which naturally means adjacent tires begin to take on more load. As shown in FIG. 6, the tires 42 are rotatably mounted by stub shafts 48 to I beams 46. The I beam structures 46 uniformly distribute the load to the carrier aircraft's conveyors rollers 49 forming a part of the cargo deck 36. These roller 49 shown in FIG. 9 are part of the cargo handling system of the cargo aircraft such as the C-17. The tire support structures are tied together with standard dual rail airdrop system side rails and roller pads 51. The pairs of tires 42 are symmetrically located at an angle $\alpha$ of about 41 degrees along the shell 40 on either side of the point 50, closest to the cargo deck 36 on the cylindrical shell 40.

The launch vehicle 30 is positioned on the vehicle carrier part 34 of the carrier and drop system 32 before the air drop. To withstand the negative loads required for aircraft safety, a retention fixture 52 may be used if necessary as shown in FIGS. 6, 7, and, 11, extends across the center of gravity (CG) 54 of the vehicle 30. A band 56 which forms a part of the retention fixture 52 extends across the top of the vehicle 30 and has four spaced apart wheels 58 which engage the external shell 40 of the launch vehicle 30, which keep the band 56 from jamming against the external cylindrical shell 40 when the launch vehicle 30 is deployed along the pneumatic tires of the carrier and drop system 32. Any thing carried on an aircraft must meet certain loads for safety reasons. As shown in FIG. 11, tie down straps 60 serve to distribute to the carrier part 34 or the cargo deck 36 negative g loads which the vehicle 30 could during an emergency apply to the retention fixture 52.

Once the carrier aircraft 20 is in flight and attains the desired launch position, the launch vehicle 30 is deployed an extraction parachute 55 of relatively small diameter which is deployed into the wake of the carrier aircraft 20, then trimming the carrier aircraft so that the cargo deck 36 slopes toward the rear of the aircraft at an angle of 4 to 7 degrees and pulling a pneumatically actuated pin 61. As shown in FIGS. 12A-12D the pin 61 attaches a load plate 64 to which fore and aft loading chains 62 are fixed by pear shaped rings 63 which are mounted to the load plate 64. The load plate 64 is supported on a lower attachment plate 57 and is attached by the pin 61 to an upper attachment plate 59. Pulling the pin 61 causes the load plate 64 to separate in the sequence illustrated in FIGS. 12A-12D. As illustrated in FIG. 10 the load plates 64 are attached on either side of the CG 54 of the launch vehicle 30. With the release of the loading chains 62 which tied the vehicle 30 to the cargo deck 36, and which restrained the vehicle in the forward and aft directions, the vehicle begins to move down and rearward on the tires 42 of the carrier and drop system 32. Motion of the vehicle rearward is also augmented by the extraction parachute 55 of relatively small diameter which is deployed into the wake of the carrier aircraft 20 before deploying the launch vehicle 30. An applying load of 5,000 to 11,000 pounds by a parachute 55 having an open diameter of 6-8 feet is suitable for a launch vehicle weighing about 72,000 lb.

In order to prevent a parachute riser 66 from rubbing against the rear 24 of the aircraft 20 it is advantageous if the parachute riser is held as low as possible with respect to the loading ramp end 27. As shown in FIGS. 1 and 4, the single riser 66 connected to the parachute 55 can have two riser lines 74 which diverge and are connected to the engine 71 near the bottom of the engine bell 70. The two riser lines initially pass beneath the top member of a T-shaped bar 72, shown in FIGS. 4, 5, and 8. The T-shaped bar 72 is fixed to the last crossbeam 88 of the carrier drop portion 38, and extends beneath the level of the cylindrical shell 40 so as not to obstruct the passage of the launch vehicle. The cross-member of the T-shaped bar has two outboard ends 76 which extend sidewardly. Early on in the deployment of the parachute, the two riser lines are close together, and are thus restrained beneath the bar 72. As the launch vehicle moves towards the rear of the aircraft, the distance in a sideward direction between the two riser lines increases. The two risers lines 74 are nevertheless still restrained in a horizontal plane by the bar 72 until such time as the distance between the riser lines 74 is greater than the distance between the outboard ends 76 of the T-shaped bar. At that point, as shown in FIG. 5, the two riser lines are no longer restrained by the T-shaped bar, and the parachute extends directly from the engine.

The drop portion 38 of the carrier 32 mounted to the loading ramp 26 has pairs of tires 42 similar to those used on the carrier part 34 of the carrier and drop system 32. In addition to the pairs of tires 42, the carrier drop portion 38 has the three final sets of tires 44, each set of tires consisting of four individual pneumatic tires 42, which form a tipoff section of the drop portion 38. The four tires 80 used in the roller sets 44 are substantially the same as the rest of the tires 42 used on the carrier and drop system. The tires are arranged in opposed pairs 82. As shown in FIGS. 8 and 9, the pairs of tires 82 are mounted to a common shaft 84 which is mounted between triangular support members 86. The triangular support members 86 bridge two crossbeams 88 distributing the tire 80 loads to the crossbeams. A shaft support beam 90 mounted between the two crossbeams 88 supports one end of the common shaft 84. The shaft support beam 90 and crossbeams 88 are joined together by transverse shafts 92. As the center of gravity (CG) of the launch vehicle 30 reaches the end 94 of the drop portion 38, the vehicle tips off the drop portion 38 as shown in FIG. 2.

By adjusting in the design, the height of the last three sets of tires 44 relative to each other and to the height of the other tires 42, a free variable is introduced in to the design which allows spreading the maximum load due to tipping the launch vehicle over the three sets of tires 44 rather than only the last set of tires 96. For example as shown in FIG. 9 the first set 98 of tires is raised half an inch above the height of the other tires 42, the second set of tires 100 is raised ²⁄₁₀ inches above the height of the other tires 42, and the third or last set of tires 96 is positioned 1 inch below the height of the other tires 42. A possibly better arrangement is +0.2 or +0.1, 0.0, −1.0 inches. The height of the tires is measured along radial lines 102 as illustrated in FIG. 6. The drop portion 38 is mounted to conveyer rolls 49 forming part of the loading ramp 26. By adjusting the height of the last three sets of tires 44 the load on the conveyer rolls 49 can be limited to those allowable, for example for a 72,000 lb launch vehicle the load on any roller 49 is limited to about 3,000 lbs for only about one second.

As shown in FIGS. 2 and 3, the launch vehicle 30 is extracted by gravity and assisted and stabilized by the parachute 55 or other type of aerodynamic decelerator. The parachute 55 exerts an extraction force which is about 30 percent of the total extraction force due to gravity and the parachute. As the launch vehicle 30 tips on the tire sets 44, the vehicle acquires a rotation in the pitch plane i.e the vertical plane containing the pitch motion of the vehicle axis 79, of for example 5 rpm or 30° per second, and leaves the carrier aircraft with a pitch up angle of approximately 8° at about T-3 seconds i.e., 3 seconds before engine ignition. As the launch vehicle falls away from the airplane, its initial pitch rate decreases rapidly from about 30° per second to a few degrees per second as the vehicle pitch angle reaches about 75°. The riser 66 of the parachute 55 produces a counter pitch torque with a moment arm that increases as the sine of the pitch angle. As pitch angle increases counter pitch torque increases, bringing the pitch rotation to near zero when the launch vehicle has a pitch up angle of about 70 and 80°.

The launch vehicle 30 has two aerodynamic chines 65 which are spaced apart circumferentially by approximately 90 degrees and which are arranged to make the vehicle 30 weakly aerodynamic stable as the vehicle moves with its long dimension substantially perpendicular to the local air-flow i.e. at a high angle. The aerodynamic chines 65 also served to dampen the roll about the axis of the launch vehicle. The aerodynamic chines may be arranged as 8 inch diameter pipes one of which functions to transport propellants, and one of which functions as a storage container for high-pressure gas bottles to operate the engine thrust vector control system (not shown). At T−0 seconds the engine is ignited and burns through the parachute risers 74 releasing the parachute 55. As shown in FIG. 3, the engine comes up to full thrust and stops the downward descent of the vehicle at T+6 seconds, at T+12 seconds the launch vehicle 30 crosses the altitude of the carrier aircraft 20 at a separation from the aircraft of about 1,300 feet. The launch vehicle 30 retains a substantial portion of the carrier aircraft's velocity, as illustrated by the horizontal component of the velocity vectors 104 in FIG. 3. The horizontal velocity vector is about 550 fps when the vehicle leaves the carrier aircraft 20 and provides an overall benefit in reduced velocity necessary to achieve orbit and greater payload.

It should be understood that the carrier aircraft 20 can be any suitable aircraft, for example a C-141, C-5B, An-124, or a cargo plane which is specially constructed or a modification of an existing aircraft. The weight of the launch vehicle must be less than the payload capacity of the carrier aircraft. A launch vehicle of around 50,000 lbs or so can have a useful orbit payload of 500 to 2000 lbs. As the weight of the launch vehicle falls below some minimum, for example less than 5,000 to 10,000 lbs, achieving orbit becomes impractical because of the increased drag losses and minimum weights for equipment such as actuators and electronic. However air launch, by reducing drag, does allow a smaller minimum launch weight than a ground launched vehicle.

In a test performed with a dummy 50,000 pound launch vehicle where the launch vehicle was dropped from the C-17 retention fixture 52, shown in FIG. 6 and FIG. 7 as well as the T-bar arrangement shown in FIGS. 4-5, and 8 were not used and thus were not found to be necessary. However they may be useful depending on the particulars of a the carrier and drop system. The drop test, as reported in Aviation Week and Space Technology, Oct. 24, 2005 pages 56-59 which is incorporated herein by reference demonstrated the release, separation and orientation of the dummy launch vehicle.

To load the launch vehicle onto the C-17 aircraft, the aircraft rear ramp is set to a horizontal orientation and the launch vehicle mounted to the carrier part 34 was, means of a winch pulled into the aircraft from a trailer which was raised to the level of the aircraft rear ramp. The carrier part 34 was then secured to the cargo deck 36 within the cargo bay 22. After the carrier part 34 was mounted to the cargo deck 36, the vehicle drop portion 38 of the carrier and drop system 32, was mounted to the loading ramp 26. Although the aircraft has a set of guide rollers 49 for sliding airdrop packages out the back these are not used for dropping the launch vehicle rather it is the wheels mounted to the carrier and drop system 32.

It should be understood that the parachute 55 may be any type of aerodynamic decelerator, and can be mounted to the engine bell 70 or other parts of the launch vehicle end 47 to which the engine 71 is mounted. The aerodynamic decelerator 55 can be detached from the launch vehicle 30 by the action of the hot gases produced by the engine 71 by burning through the riser lines 74. Alternatively, an electrically controlled three ring release or pyrotechnic cutter can be used to release the riser lines 74.

It should be understood that while the tires 42, 80 are preferably pneumatic, the tires could be wheels of any type. It should also be understood that a principal difference between the launch vehicle 30 of this invention and other types of air launched vehicles is that the vehicle uses kinematics and a drag device spaced from the launch vehicle by a line to orient the launch vehicle in the selected launch attitude, preferably between 70 and 80° from the horizontal. Typically air dropped launch vehicles use aerodynamic surfaces such as wings, or drag devices alone to orient the launch vehicle.

It should be understood that the launch vehicle 30 of this invention may be any suitable launch vehicle, and that the vehicle may be orbital or suborbital. In particular, the air launch system of this invention is particularly advantageous for vehicles having at least a first stage propellant which is pressure fed, for example by compressed gases or by the vapor pressure of the propellant of the propellants themselves. Propellants such as liquid oxygen and liquid propane may readily be conditioned to have vapor pressures sufficient to feed the propellants at a selected pressure into the rocket chamber of the first stage engine. For a pressure fed stage, weight of the stage is nearly proportional to the required chamber pressure. The air launching of the launch vehicle 30, if carried out above a significant portion of the atmosphere, permits an engine chamber pressure which is substantially reduced from the pressure required by a ground launched vehicle of the same performance.

It is understood that the invention is not limited to the particular construction and arrangement of parts herein illustrated and described, but embraces all such modified forms thereof as come within the scope of the following claims.

We claim:

1. An apparatus for releasing forward and aft extending load restraint members, comprising;
   an aircraft load deck;
   an object restrained on the load deck by a plurality of forward extending load restraining members which are mounted to the aircraft load deck, and by a plurality of aft extending load restraining members which are mounted to the aircraft load deck;
   wherein the plurality of forward extending load restraining members and the plurality of aft extending load members are connected to a load plate which is mounted between a lower attachment plate which is mounted to the object and an upper attachment plate which is mounted to the object;
   wherein the load plate has an aft lower side and a forward lower side joined by a lowermost side, and wherein an attachment pin is mounted to the load plate for movement thereon;
   wherein the lower attachment plate has an upwardly opening notch which receives the load plate, wherein the upwardly opening notch has an aft support surface which is engageable with the aft lower side of the load plate, and wherein the upwardly opening notch has a forward support surface engageable with the forward lower side of the load plate, and wherein the aft support surface and the forward support surface are joined by a lowermost support surface, the lowermost support surface being engageable with the lowermost side of the load plate, the aft support surface, the forward support surface, and the lowermost support surface engaging the load plate to transmit forward, aft, and downward loads from the forward and aft load restraining members;
   wherein the lowermost side of the load plate hingedly engages the lowermost support surface to prevent removal of the load plate from engagement with the lower attachment plate except following a hinging movement of the load plate with respect to the lowermost support surface of the lower attachment plate; and
   wherein the upper attachment plate has portions defining an aperture for receiving the attachment pin, so that when the attachment pin is received within the aperture of the upper attachment plate, the load plate is prevented from the hinging movement with respect to the lowermost support surface and the load plate is captured between the lower attachment plate and the upper attachment plate.

2. The apparatus of claim 1 wherein the attachment pin is a pneumatically actuatable pin.

3. The apparatus of claim 1 wherein the plurality of forward extending load restraining members, are connected by a pear-shaped ring mounted to the load plate, and the plurality of aft extending load members are connected by a pear-shaped ring mounted to the load plate.

4. The apparatus of claim 1 wherein the load plate has a hexagonal shape, and wherein the aft lower side, the forward lower side, and the lowermost side make up the lower three sides of the hexagonal shape.

5. The apparatus of claim 1 wherein the object has a port side and a starboard side, and wherein the load plate, the lower attachment plate, the and upper attachment plate form a release mechanism which is mounted to the port side of the object, and further comprising a second said release mechanism which is mounted to the starboard side of the object.

* * * * *